S. HERZOG.
ALCOHOL LAMP.
APPLICATION FILED JAN. 11, 1917.
1,229,078.
Patented June 5, 1917.
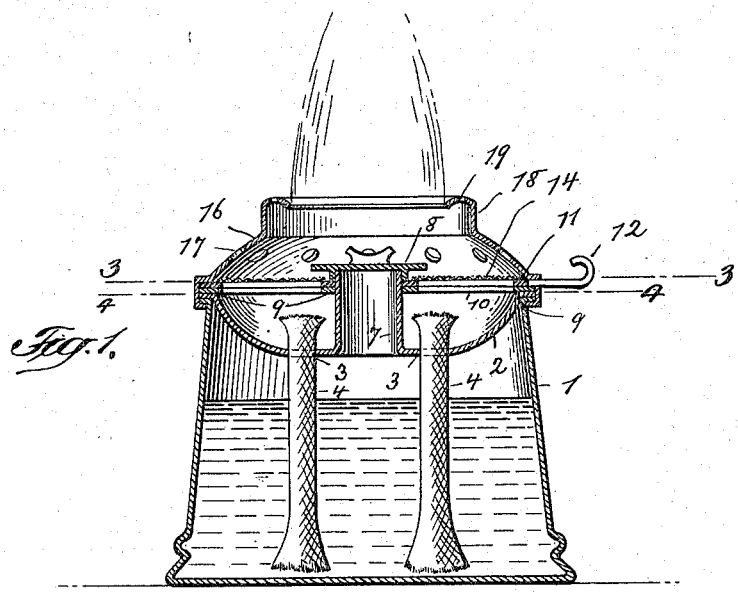
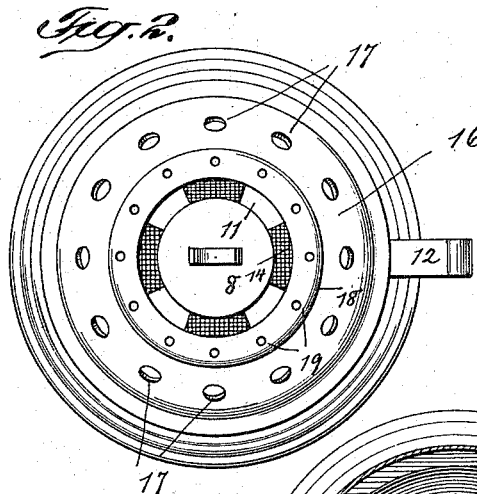
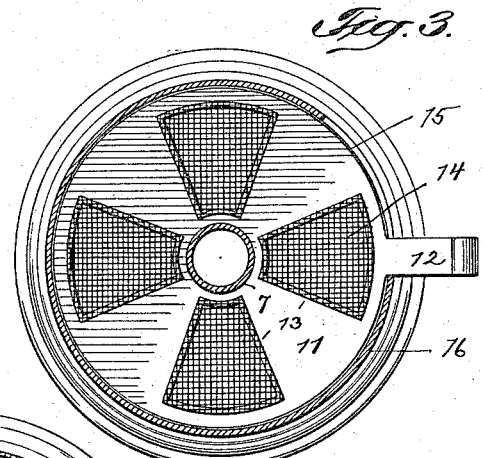
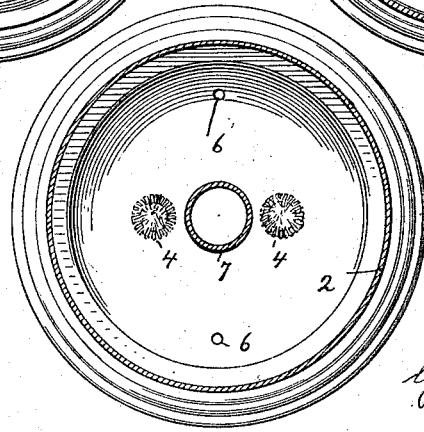
Inventor
Soma Herzog
by his attorney

UNITED STATES PATENT OFFICE.

SOMA HERZOG, OF NEW YORK, N. Y.

ALCOHOL-LAMP.

1,229,078.  Specification of Letters Patent.  Patented June 5, 1917.

Application filed January 11, 1917. Serial No. 141,747.

*To all whom it may concern:*

Be it known that I, SOMA HERZOG, a citizen of the United States, and a resident of New York city, in the county and State of New York, have invented certain new and useful Improvements in Alcohol-Lamps, of which the following is a specification.

This invention relates to an alcohol lamp of novel construction which produces an even conical blue flame of great intensity well adapted for cooking or heating purposes.

In the accompanying drawing:

Figure 1 is a vertical central section of an alcohol lamp embodying my invention;

Fig. 2, a plan;

Fig. 3, a section on line 3—3 Fig. 1, and

Fig. 4, a section on line 4—4 Fig. 1.

Upon the top of a vessel 1 constituting the alcohol container, is mounted, an annular cup or gasifying chamber 2 having a plurality of apertures 3, for the accommodation of asbestos wicks 4. The cup is further provided with vents 6, and with an upwardly extending central tubular stem 7, upon which is supported a spreader 8. On cup 2, rests an annular disk 9, encompassing stem 7, which thus serves to center the disk. The latter is provided with a suitable number of preferably sector-shaped openings 10 through which the gases ascend. Upon disk 9, is superposed a register 11, having a handle 12 and a central eye for the accommodation of stem 7, around which the register is rotatable. The register has a plurality of sector-shaped openings 13 corresponding to openings 10 of disk 9 and adapted to uncover the latter to any extent desired. Either the openings 10 of disk 9, or the openings 13 of register 11 are covered with wire gauze 14 the drawing showing the latter construction.

Handle 12 projects outwardly through a peripheral slot 15 of an annular cap 16 mounted on vessel 1, and inclosing cup 2, disk 9 and register 11.

Cap 16 is provided with a plurality of main air orifices 17, and with an upwardly extending inner flange 18, provided with a row of supplemental smaller air orifices 19.

In use, the alcohol drawn into cup 2 is vaporized, the vapors ascending through the gauzed openings 10, 13 and burning within the flange 18 of cap 16 with a full blue flame.

I claim:

An alcohol lamp comprising a container, an annular apertured cup mounted thereon, wicks extending from the container into the cup, said cup having a central stem, a spreader mounted upon said stem, an annular disk centered upon the stem, and having a plurality of openings, a register having corresponding openings and rotatable on the stem, the openings in one of said parts being covered with wire gauze, and an annular cap mounted on the container, said cap having a plurality of main air orifices, an inner flange, and a plurality of auxiliary air orifices in said flange.

SOMA HERZOG.

Copies of this patent may be obtained for five cents each, by addressing the "Commissioner of Patents, Washington, D. C."